United States Patent [19]

Delettre

[11] 4,227,635
[45] Oct. 14, 1980

[54] APPARATUS FOR THE MANUFACTURE OF A WINDOW BY DETACHMENT OF THE EDGES OF A SHEET OF GLASS ALONG A SCORE

[75] Inventor: Jean-Pierre Delettre, Thourotte, France

[73] Assignee: Saint-Gobain Industries, Neuilly-sur-Seine, France

[21] Appl. No.: 923,168

[22] Filed: Jul. 10, 1978

[30] Foreign Application Priority Data

Jul. 21, 1977 [FR] France .............. 77 22349

[51] Int. Cl.³ .................................... C03B 33/04
[52] U.S. Cl. ...................... 225/96.5; 225/2; 225/97; 225/103
[58] Field of Search ............ 225/96.5, 2, 103, 93, 225/97

[56] References Cited

U.S. PATENT DOCUMENTS

| | | | |
|---|---|---|---|
| 2,259,765 | 10/1941 | Morris | 225/93 |
| 2,291,451 | 7/1942 | Craig et al. | 225/2 |
| 3,137,426 | 6/1964 | Brenneisen | 226/10 |
| 3,178,085 | 4/1965 | Jochim | 225/2 |
| 3,259,286 | 7/1966 | LeGras | 225/2 |
| 3,300,112 | 1/1967 | Tailleur et al. | 225/93 |
| 3,520,457 | 7/1970 | Augustin | 225/96.5 X |
| 3,770,173 | 11/1973 | Carothers et al. | 225/2 |
| 4,004,723 | 1/1977 | Kabanov et al. | 225/103 |
| 4,033,490 | 7/1977 | Ulivi | 225/1 |
| 4,046,300 | 9/1977 | Welker | 225/96.5 X |

FOREIGN PATENT DOCUMENTS

| | | | |
|---|---|---|---|
| 1370508 | of 1964 | France . | |
| 1465518 | of 1966 | France . | |
| 2302974 | of 1976 | France . | |
| 152286 | of 1962 | U.S.S.R. | 225/96.5 |

Primary Examiner—Frank T. Yost
Attorney, Agent, or Firm—Pennie & Edmonds

[57] ABSTRACT

In the manufacture of a window, an apparatus and method for detachment of edges from a sheet of glass along a cut-off line or score is disclosed. The apparatus comprises a frame surrounding an open area, elastic means in the form either of elastic cables connected together at one end and connected to the frame at the other end or a belt connected to the frame and traversing the open area, a support for supporting the sheet of glass and means for moving one of the frame or support for supporting the sheet of glass so that the elastic means acts on to flex the edges of the sheet of glass about the cut-off line or score and break the edges from the window. The apparatus, further, may comprise structure for incising break lines in the edges of the glass sheet to assist in breaking the edges from the window.

17 Claims, 8 Drawing Figures

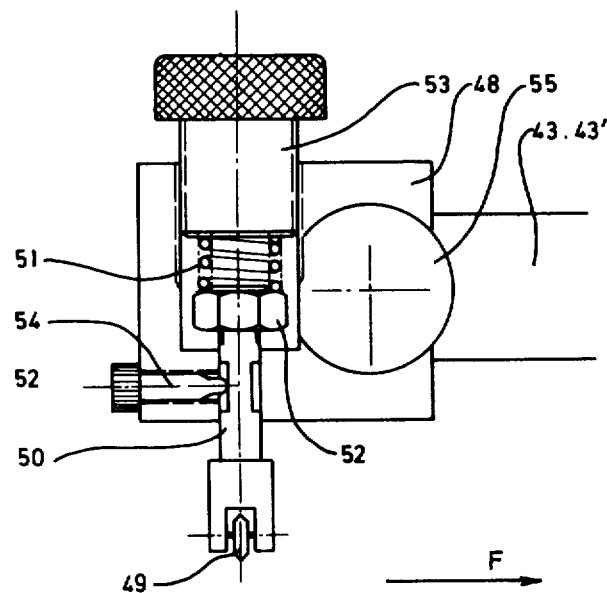
Fig. 6
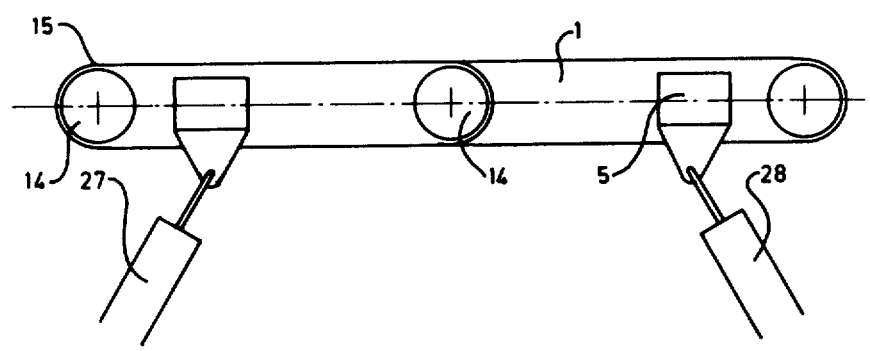

APPARATUS FOR THE MANUFACTURE OF A WINDOW BY DETACHMENT OF THE EDGES OF A SHEET OF GLASS ALONG A SCORE

BACKGROUND OF THE INVENTION

1. Field of the Invention

The present invention relates to an apparatus and method for detachment of the edge portion of glass sheets along a cut-off line or score previously traced on the glass sheet. The apparatus and method of the invention has particular application in the manufacture of a window, such as a windshield, rear and side window for an automobile, which may have any desired shape.

2. Description of the Prior Art

It is well known that strips of glass may be detached along a cut-off line or score which is rectilinear without any great difficulty, but problems oftentimes are encountered when it becomes necessary to both automatically and effectively detach strips of glass along a cut-off line or score which, rather than being rectilinear, may be closed and have, for example, a plurality of rectilinear or substantially rectilinear portions connected by corners which may be rounded or sharp.

In an automated production line for manufacturing automobile windows, the detachment unit is situated upstream from the finishing unit at which the edges of the windows may be ground prior to, for example, tempering operations. The detachment operation must, therefore, be effected rapidly in order to adequately supply one or often several automated finishing units. The detachment operations must, moreover, be reliably performed so that a sheet of glass with unbroken or partially broken edge portions does not reach the grinder which operates within relatively limited conventional tolerances. The detachment operation, furthermore, must provide sharp, clean edges without chips or microfissures. To this end, during the tempering operations, such edge faults form starting points for breakage of the window.

When the detachment operation is carried out improperly, it is sometimes possible to continue grinding the edges of the glass until these faults disappear. However, such an operation is both time-consuming and costly due to the additional wear on the diamond-tip grinding element.

Apparatus for and methods of detaching the edges from a sheet of glass along the periphery of a cut-off line or score automatically, rapidly, with good quality, and with complete reliability previously have been proposed in patents assigned to the assignee of the present application. Such apparatus including the use of mechanical devices for detachment of the edges from a sheet of glass are disclosed, for example, in French Pat. Nos. 1,370,508 and 1,465,518; and in U.S. Pat. Nos. 3,137,426, 3,178,085, 3,259,286, 3,300,112 and 3,770,173. The first of the noted French patents discloses mechanical devices in the form of hammers to tap the edges of the sheet of glass in the vicinity of the cut-off line or score until the edge portions detach from the sheet of glass. Aside from the last-mentioned U.S. patent, the other patents disclose rollers or the like for exerting pressure on one or both surfaces of the sheet of glass and at one or both sides of the cut-off line or score. The last-mentioned patent additionally discloses abutments which come in contact with the edges of the sheet of glass to be detached.

The mechanical devices as generally described above often produce faults during the detachment of the edges from the sheet of glass and, accordingly, these devices are not totally compatible with automatic and subsequent tempering. Additionally, it has been found to be difficult to produce, with mechanical devices of the type generally described above, windows of certain shapes, particularly windows of trapezoidal shape. Moreover, it has been found difficult to effectively detach the edges from sheets of glass having certain thicknesses.

A more recent attempt in detaching of edges from a sheet of glass is disclosed in U.S. Pat. No. 4,033,490, also assigned to the assignee of the present invention. The apparatus disclosed therein has been found to obviate the disadvantages of the prior art and functions to detach the edges from a sheet of glass by combining an application of heat to produce a clean, sharp break along at least a part of the cut-off line or score with a subsequent mechanical detaching operation to break off the edges which were not detached by heating. The application of heat is described as being provided by gas blow pipes located in the region of the corners of the window and disposed at an angle toward the side of the sheet of glass such that the flame from the blow pipe heats the edge to be detached. The mechanical operation is carried out as a second step and accomplished by means of U-shaped pincers which are disposed so that upon elevation of the sheet of glass the pincers overlap the edge of the sheet of glass and act upon it to deflect or bend it about the cut-off line or score. The apparatus including both thermal and mechanical means has been found to provide good cut-off quality. Thus, the edges are clean, with no chips and with no microfissures which may constitute a start or a break at the time of tempering. Further, the thermal and mechanical means provide complete reliability in that edges which are not detached by the action of the blow pipes alone are detached by the action of the U-shaped pincers.

The aforementioned thermal and mechanical means have been found to provide complete satisfaction when used for quantity production of the same window. However, if the type of window to be fabricated requires frequent change, the adjustment time vis-a-vis the operating time becomes too great. Hence, in the fabrication of a laminated windshield, the bending of the two sheets of glass intended to be joined is done on a form borne on a carriage. A form adapted to each type of windshield and one form per windshield are necessary. To limit the number of carriages corresponding to a given type, the train of carriages in use for bending is made up of a succession of different carriages. This requires finishing windows of all the types and, hence, both frequent changing of the cut-off line or score and resetting of the detachment devices for each change. These adjustments require an excessive time which adds to the overall cost of the procedure for fabricating a window.

SUMMARY OF THE INVENTION

The apparatus and method of the present invention obviates the disadvantages of the prior art processes for detaching the edges from a sheet of glass. To this end, the adjustment at each changeover in production is eliminated or considerably reduced. The apparatus of the invention for detaching the edges from a sheet of glass at and along a cut-off line or score previously incised at the surface of the sheet of glass comprises a frame which may be characterized as a "breaking chassis" on which there is supported elastic means, means for support of the sheet of glass and means for relocating one or both of the frame and the means for support of the sheet of glass into contact, one with the other. The elastic means acts on the edges of the sheet of glass so that they flex about and detach from the cut-off line or score. The frame preferably is stationarily supported in a plane which is not perpendicular to the plane of the sheet of glass, and preferably the apparatus includes structure for incising break lines along the edges to be detached from the glass sheet. Each break line commences at a point near the cut-off line or score and continues to the edge of the glass sheet. The sheet of glass is conveyed to the apparatus by a conveyor for positioning relative both to the frame and the means for support of the glass sheet. The frame may be formed by a plurality of elements surrounding an open area and the elastic means may be defined either by a plurality of elastic cables joined at one end or an elastic belt, both being supported by the frame in the open area.

Other objects, features and advantages of the present invention will be made apparent in the following detailed description which may be read in conjunction with a consideration of the figures of drawing hereafter described.

DESCRIPTION OF THE DRAWINGS

FIG. 6 is a partial view of the conveyor of FIG. 1 and the structure of FIGS. 4 and 5 for the incising of break lines;

DESCRIPTION OF THE PREFERRED EMBODIMENTS

Figure 1:
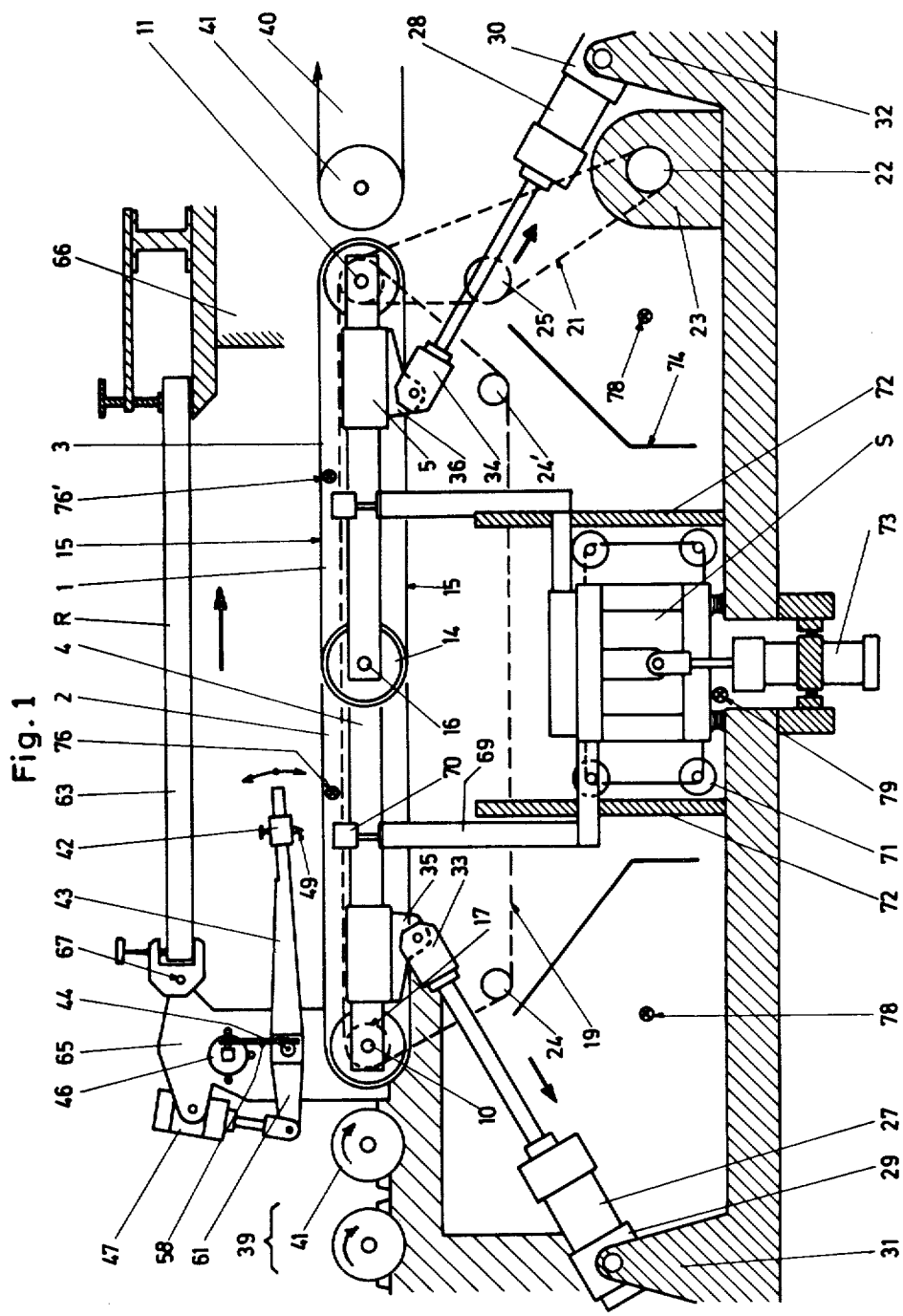
FIG. 1 is a schematic presentation, in side elevation, of the overall apparatus of the present invention.

The apparatus of the present invention comprises a portion of the overall operative structure in the fabrication of glazing which may be a window, such as a windshield, side window, or rear window for an automobile. In the overall operation, the apparatus, for example, may be located downstream of a work station at which the cut-off or score line (hereinafter "score") for delimiting the area of the window may be incised on the sheet of glass V and upstream of further work stations at which operations such as bending of the window may be carried out. In FIG. 1, a portion of a conveyor 39 including at least a pair of rollers 41 for conveying the sheet of glass (hereinafter "sheet") from an upstream work station to the apparatus and a portion of a conveyor 40 for conveying the window from the apparatus to a downstream work station is schematically illustrated. Conveyor 40, likewise, includes at least a pair of rollers 41 mounting a conveyor moving in the direction of the arrow. Both conveyors are of relatively short length and driven by a gear reduction unit (not shown) at a single speed, which may be approximately 30 meters per minute.

The apparatus of the present invention comprises a number of major sub-assemblies including a
sub-assembly for transporting an individual sheet;
a sub-assembly for incising break lines on the sheet;
and a sub-assembly for detaching the edges of the sheet from the window.
Each of these sub-assemblies
and their cooperation one with the other will be described below.

Figure 3:
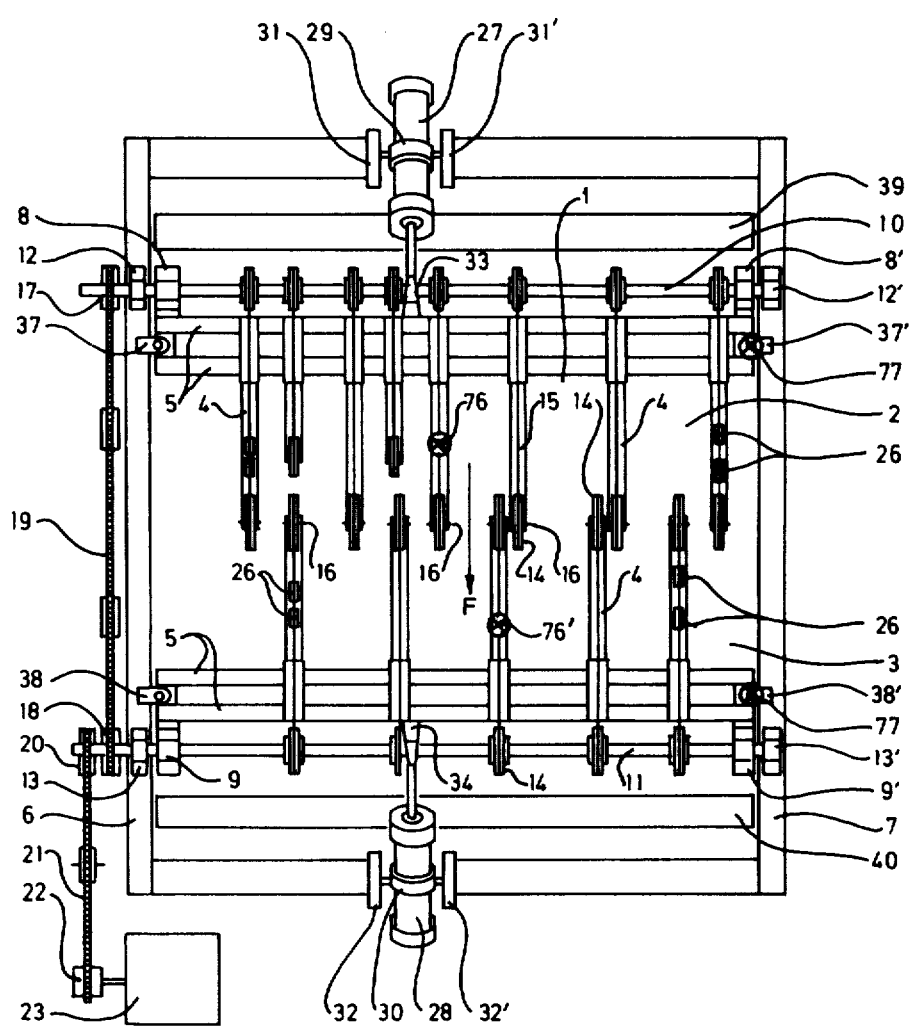
FIG. 3 is a schematic presentation of a further sub-assembly of the apparatus, particularly the conveyor for transport of sheets of glass, as seen in top plan view.
Figure 4:
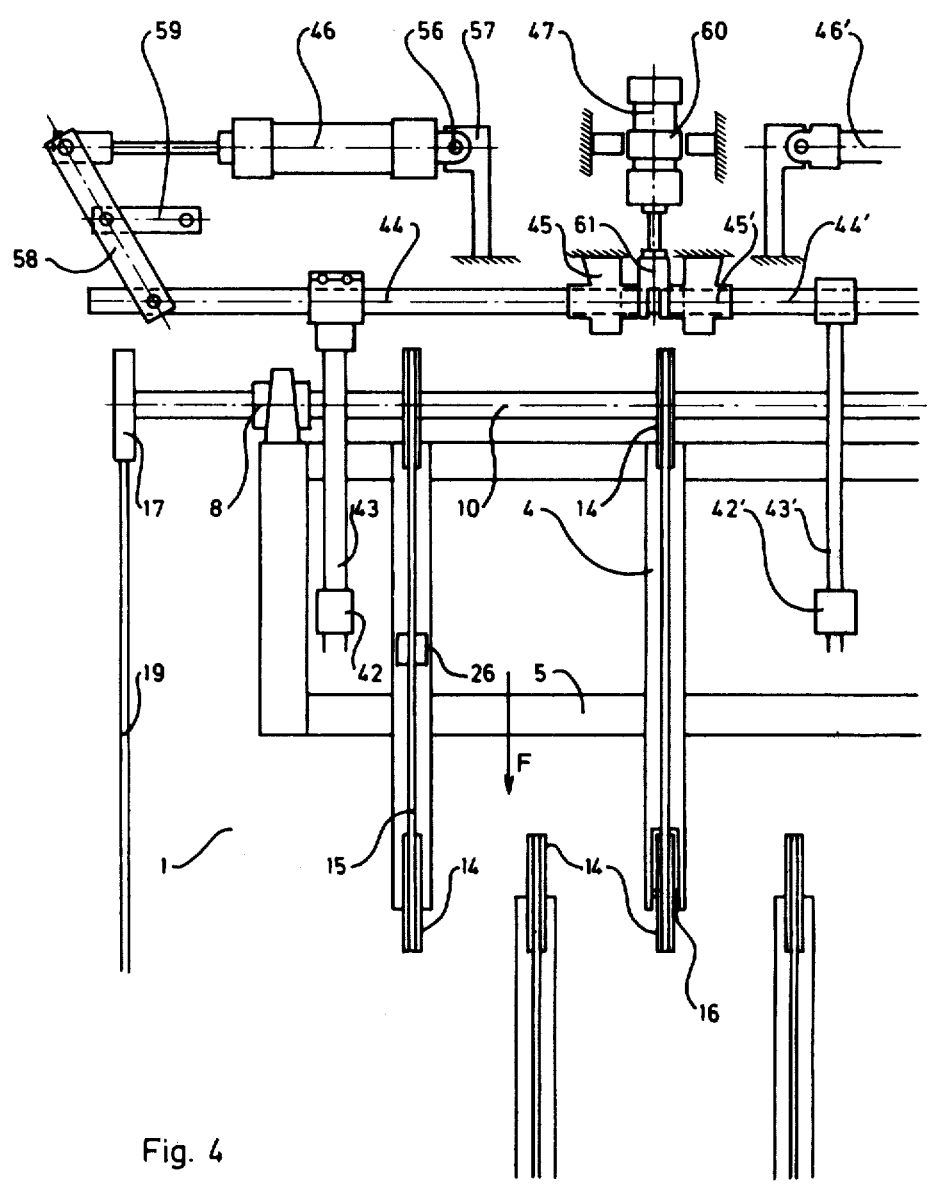
FIG. 4 is a schematic presentation of a further sub-assembly of the apparatus, particularly the structure for the incising of break lines on the sheet of glass, as seen in top plan view.

Referring to FIGS. 1 and 3, the sheet V is conveyed by a conveyor 1 including an upstream conveyor 2 and a downstream conveyor 3 ("upstream" and "downstream" referencing direction of movement F) to a position at which movement is arrested. The conveyors may be characterized as flaps, each formed by a plurality of arms 4 arranged in a parallel family and one but preferably two stringers 5 upon which the arms are supported in cantilevered, spaced apart relation. The stringers comprise flat mounting members disposed perpendicular to and extending between a pair of cross pieces 6, 7 supported by the frame of the apparatus. The portions of the frame are unnumbered but generally illustrated in section throughout the figures. The cross pieces are arranged parallel to one another and spaced apart to accommodate sheets of a dimension typically handled in fabrication processes such as now being described.

A pair of members 8, 8' support the stringer or stringers of the conveyor 2 at opposite ends between cross pieces 6, 7; and a pair of members 9, 9' support the stringer or stringers of conveyor 3, in like fashion. Each member includes a collar portion and a base portion which either may be integral with or fixedly mounted to the stringer or stringers which it supports. As will be discussed, each conveyor is mounted for movement pivotally between a horizontal disposition seen in FIG. 1 and a disposition approaching the vertical in operation of the apparatus. To this end, conveyor 2 is mounted on a pivot axis comprising a shaft 10 and conveyor 3 is mounted similarly on a shaft 11. The shafts are parallel and supported in bearings 12, 12' and 13, 13', respectively, mounted on the cross pieces 6, 7.

A pulley is mounted on the end of each arm and a further pulley 14 is supported on the individual shafts 10, 11 in longitudinal alignment. A belt 15 is entrained therearound and supported in movement by the pulleys. An axle 16 supports each arm pulley for rotational movement and each shaft pulley is keyed or otherwise secured to the shaft for conjoint rotational movement.

With reference to FIG. 3, one end of each shaft 10, 11 extends beyond a cross piece, such as the cross piece 6. A sprocket 17 and a like sprocket 18 is supported by an individual one of shafts 10, 11. An endless chain 19 is entrained about the sprockets 17, 18. A further sprocket 20 is carried by one or the other of the shafts 10, 11, either adjacent the sprocket 17, 18 or on the other end of the shaft. The sprocket 20, together with a sprocket 22, supported on the output shaft of a gear reduction unit 23, support an endless chain 21. The gear reduction unit is capable of a two-speed drive for purposes as will be discussed below.

As illustrated in FIG. 1, the gear reduction unit is supported by the frame of the apparatus. A pair of sprockets 24, 24' and a sprocket 25, also supported by a portion of the frame lend additional support for chains 19 and 21 and permit adjustment of tension.

As illustrated in FIG. 3, the arms 4 of the conveyors 2, 3 extend toward one another and are disposed in a fashion such that the arms of one conveyor are interdigitated between the arms of the other conveyor. The length of the conveyors is such that the axles 16 substantially are coaxially aligned. Further, one of the conveyors may include a plurality of arms which extend throughout a distance less than that of the other arms and in a disposition of alignment with at least some of the arms extending from the other conveyor. One or more rollers 26 are carried by the arms of each conveyor 2, 3 disposed adjacent the cross pieces 6, 7 thereby to support the belt 15 within the region generally mid-way between the pulleys 14. Additional support rollers may be mounted on other arms. These rollers support the sheet during the operation of incising the break lines.

The arms 4 may be formed by a pair of spaced apart, parallel plates between which the axles 16 for support of pulleys 14 and further axles (not shown) for support of rollers 26 are received for rotation.

The conveyors 2, 3 as previously discussed, are mounted for pivotal movement between a position as illustrated in FIG. 1 and a position at which the flaps approach a vertical attitude. To this end, the conveyor 2 is capable of pivotal movement about shaft 10 in a clockwise direction and the conveyor 3 is adapted for pivotal movement about the shaft 11 in a counterclockwise direction. Each conveyor is actuated in movement by any convenient motive means such as, for example, an hydraulic or pneumatic cylinder, or a solenoid, to name a few well-known structures. In the preferred embodiment, the motive means includes a pair of cylinders 27, 28, both of which are pneumatically actuated, and actuating rods coupled to a respective conveyor 2, 3. To this end, a cap 33 may be mounted at the end of the rod of cylinder 27 and a lug 35 may be supported on the underside of the stringer or stringers 5 of conveyor 2. The cap may include a bifurcated end into which the lug is received. The parts may be connected by a pin or the equivalent for relative movement. Cylinder 28 is similarly connected to conveyor 3 by a cap 34 and lug 36. As illustrated in FIG. 3, each lug is supported to the underside of the stringer or stringers of the respective conveyor, preferably in the mid-region between the cross pieces 6, 7. This mounting will reduce or eliminate the twisting moment in movement of the conveyors about their pivot axes. A collar 29 is received around the cylinder 27 and a collar 30 is received around the cylinder 28. As may be seen to advantage in FIG. 3, the cylinders are disposed between a pair of side plates formed in the frame. Each collar includes a pair of projections which may be received in bearings in the side plates 31, 31' and 32, 32' so that the cylinders 27, 28 are capable of pivotal movement as required in following movement of the conveyors 2, 3.

A pair of plates 37, 37' supported by the cross pieces 6, 7, as by welding, limit movement of conveyor 2 in return to the horizontal position. A like pair of plates 38, 38', and similarly supported limit movement of conveyor 3, also in return to the horizontal position.

The apparatus for incising break lines from within the region closely adjacent the score of the closed contour of the window to be fabricated to the edge of the sheet includes a cutting wheel 49 carried by a pair of cutting heads 42, 42'. The cutting wheel may be comprised of any particular material as known in the art for incising break lines within the sheet and in the particular adaptation of the structure to be described the cutting wheels are movable about axes located parallel to the direction of movement of the sheet. The direction of movement of the sheet is illustrated by the arrow F.

As briefly discussed above, the cutting wheels are disposed to incise break lines on the sheet, the break lines being generally a prolongation of the longest of the rectilinear or substantially rectilinear lines of the closed contour of the window previously traced in the upstream work station from which the sheet has arrived.

Figure 5:
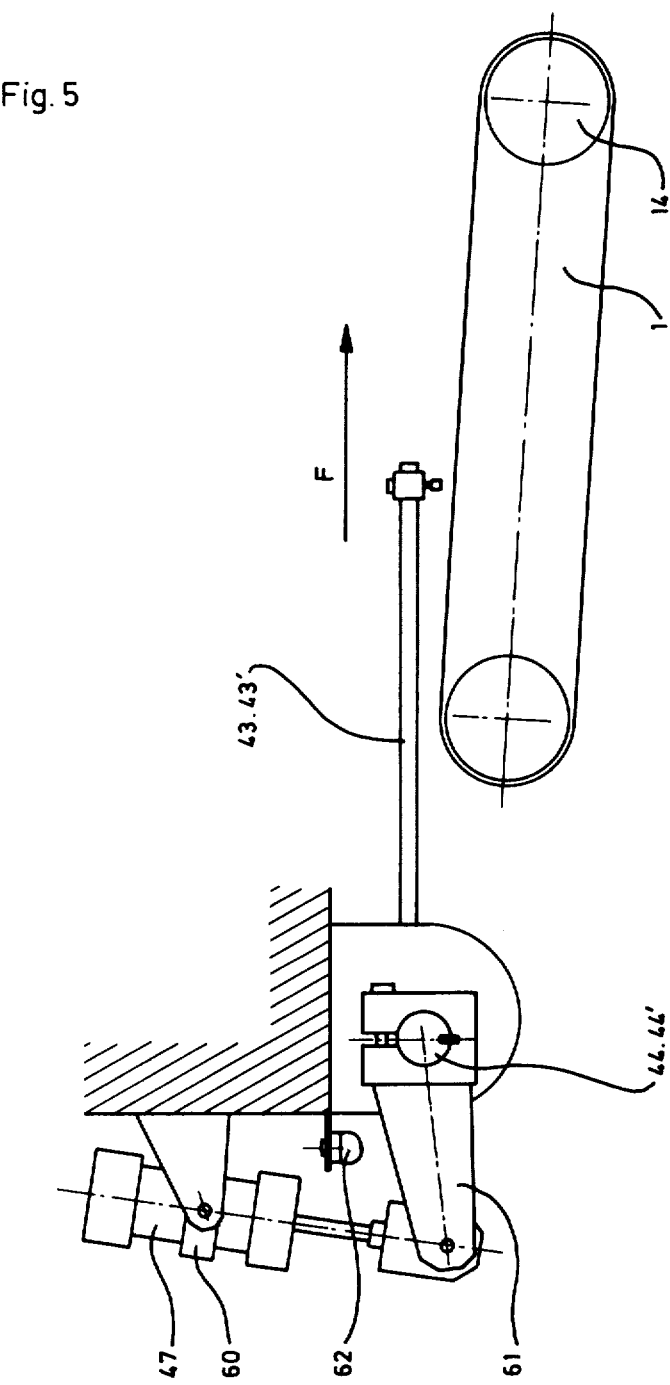
FIG. 5 illustrates a portion of the structure of FIG. 4 as seen in side elevation.

A pair of arms 43, 43' support the cutting heads 42, 42', respectively, and each arm is supported by one of a pair of shafts 44, 44' disposed parallel to and in a disposition above the shaft 10 at the upstream end of conveyor 1. The arms are adjustable along the shaft and keyed or otherwise secured to the shaft for movement transverse to the direction of arrow F and for rotary movement. Transverse movement is imparted to the shafts by a pair of moving means 46, 46' and rotary movement is imparted to the shafts by a moving means 47. A pair of sleeves 45, 45' support the shafts in coaxial alignment generally in the region between their ends. A further pair of sleeves (not shown) may be provided, as necessary, for support of the shafts within the vicinity of their ends. The sleeves support a rib (see FIG. 5) and the shafts are channelled for sliding movement along the rib. The sleeves are supported by the frame of the apparatus. The motive means 46, 46' as well as a motive means 47, may be an hydraulic or pneumatic cylinder or a solenoid. In the preferred embodiment, each motive means comprises a pneumatic cylinder having a rod which is actuated upon actuation of the cylinder. Each cylinder is supported by the frame of the apparatus in a manner whereby it is capable of pivotal movement to permit freedom of movement of the rod and the shafts 44, 44' which they control. The manner of mounting the cylinders 46, 46' are similar and include a lug 57 supported by the frame of the apparatus and a cap 56 having a pair of bifurcated arms between which the lug is received. The lug and cap may be secured together by an axle or pin. A link 58 (only one is shown) connects the rod of cylinders 46, 46' and the shafts 44, 44'. The link pivots about a plate 59 and is pivotally mounted to the end of a rod and within the region of the end of a shaft. The plate is mounted to the frame of the apparatus.

A link 61 provides a means for connecting the cylinder 47 and shafts 44, 44' for imparting limited rotational movement thereby to pivot the arms 43, 43' and the cutting heads 42, 42', respectively, toward the sheet for purposes of incising break lines as previously discussed. The shafts 44, 44' are received through a collar formed by a pair of spaced apart extending portions and lug portion of the link is received between a pair of spaced apart arms of a cap, similar to the cap 33, carried at the end of the rod of cylinder 47. A collar 60 is received around the cylinder and a pair of pins or projections enter into a bearing carried by the frame of the apparatus so that the cylinder is capable of pivoting, as may be required during operation. A stop 62 supported by the frame of the apparatus (see FIG. 5) limits counterclockwise rotation of the link 61 and movement of the cutting heads 42, 42' into a position at which cutting wheel 49 engages the sheet.

Referring now to FIG. 6, the cutting heads 42, 42' comprise a clamp 48 supported by and capable of movement along a respective arm 43, 43' for locating the position of the cutting heads and cutting wheel 49. Relocation of the cutting wheel may be required by the size of the window to be fabricated thereby to incise the break lines at the prolongation of the longest rectilinear or substantially rectilinear score of the window. Thus, the clamp is adjustable in position by sliding in grooves along the length of arms 43, 43' and is located in a position of adjustment by a thumb screw 55. A stem 50 supports an end member including a channel between a pair of spaced apart surfaces. The cutting wheel is supported for rotation between the surfaces so that only a portion of the cutting wheel extends below the stem. The cutting wheel 49 is capable of adjustment both in its position relative to the sheet V and in the amount of pressure exerted by the cutting wheel on the surface of the sheet to improve the quality of the break line. To this end, the stem 50 is capable of sliding in the clamp in response to a compressive force developed by a spring 51 acting between a nut 52 and a shoulder of a pressure adjusting screw 53 received by clamp 48. A holding screw 54 also received by the clamp is capable of bearing on the stem within the region of one of a plurality of elongated cutouts extending longitudinally of the stem.

Figure 2:
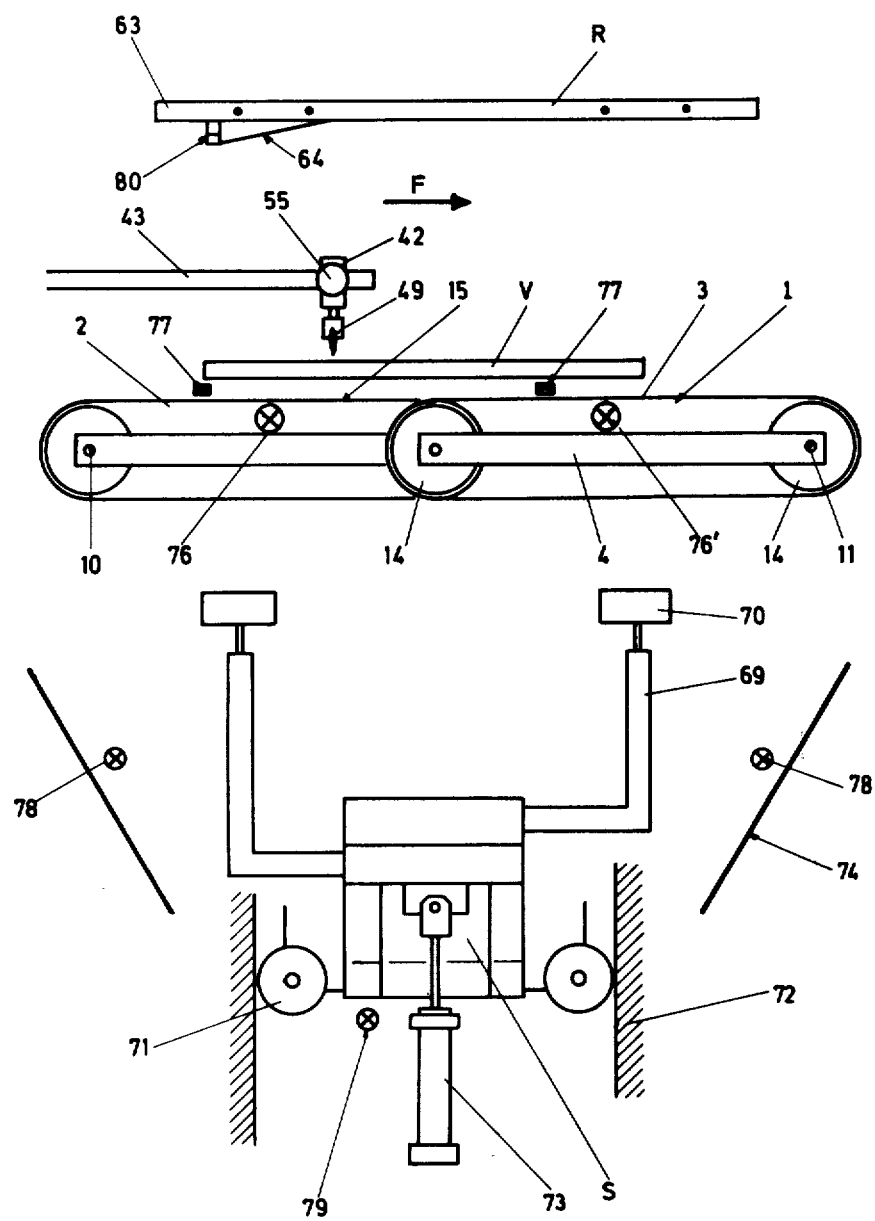
FIG. 2 is a schematic presentation of one sub-assembly of the apparatus, particularly the structure for detaching the edges from a sheet of glass along a cut-off line, as seen in side elevation.

The structure for breaking the edges surrounding the closed contoured score of the window from the sheet V is disposed, as best seen in FIGS. 1 and 2, in relation to the structure heretofore described. The structure for breaking the glass edges outside of the closed contoured score, traced on the sheet in the upstream work station includes a supporting table generally designated by the letter S and a breaking chassis generally designated by the letter R. As illustrated in FIGS. 1 and 2, the supporting table is located below the conveyor 1 for transporting sheets and the breaking chassis is supported above the conveyor in vertical alignment with the supporting table. One or both of the supporting table S and the breaking chassis R is movable toward the sheet V into a position at which the supporting table and breaking chassis cooperate thereby to break the edges outside of the closed contoured score. In the preferred embodiment, the supporting table S is adapted for movement in a vertical direction and the breaking chassis R is fixed horizontally in a manner to be described.

The breaking chassis is formed by a frame 63 including a plurality of individual sections connected together at their extremities to provide a central rectangular opening. A mount 65, 66 comprising a portion of the frame of the apparatus together with a gripping member support the sections of major length of the frame. The mount 66 includes a flat plate having a surface which extends substantially coextensive with the length of the section of major length and the gripping member has a supporting arm of substantially the same length. The gripping member is pivotally mounted to the mount 65 by an axle 67 for pivotal movement in a counterclockwise direction. A screw with a surface engaging plate at one end may be threaded toward and away from the surfaces of the two sections to fixedly secure the breaking chassis in the position of FIG. 1.

Figure 7:
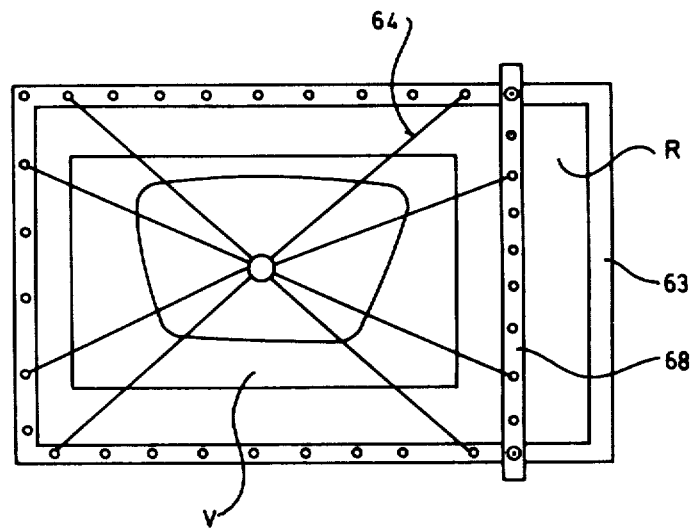
FIG. 7 is a plan view of a breaking chassis and the elastic means of FIGS. 1 and 2; and, FIG. 8 is a view similar to that of FIG. 7 illustrating a further breaking chassis and elastic means.

The frame 63 may support an elastic element in the form of a plurality of elastic bands or cables 64 or a rubber belt 64'. As illustrated in FIG. 7, the elastic cables are connected together at one end by means of a ring or the equivalent and are drawn outwardly toward the sections of the frame. The elastic cables are secured by means (not shown) such as a hook in one of several holes provided around the frame. The elastic cables are provided in pairs, the number of pairs being equal to the number of corners of the window to be formed. More particularly, the elastic cables of each pair of elastic cables are disposed thereby to extend across the rectilinear or substantially rectilinear score on either side of a corner. A section 68 providing a means of adjustment of the tension of each of the elastic cables is supported between a pair of opposed sections of the frame, such as the sections of major length (see FIG. 7). The section 68 may be slidably mounted on the supporting sections in any particular manner and fixedly located in a position of adjustment.

Figure 8:
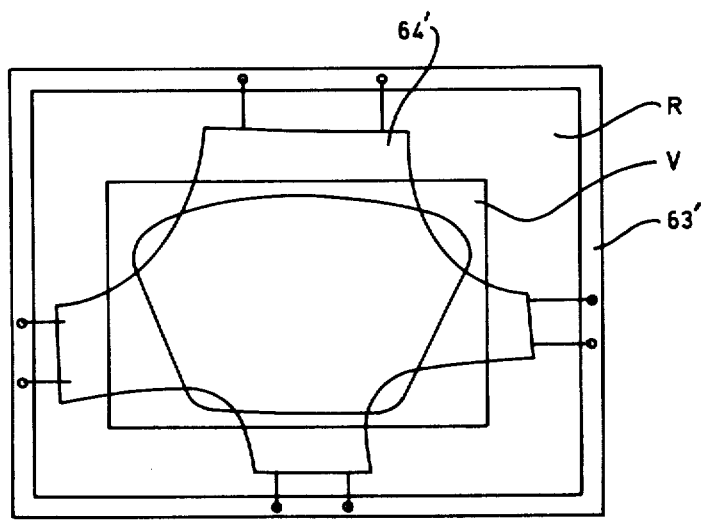

FIG. 8 illustrates a frame 63' of generally similar form as that discussed with regard to FIG. 7. The frame 63' accommodates a belt 64' having an outline to conform with the outline of the window to be fabricated. In the present embodiment, the belt 64' has an outline generally in the form of a cruciform since the window is trapezoidal with four corners. Each of the ends of the belt is attached to a section of the frame by a pair of elastic members extending from the belt with each pair of elastic members supported by a respective section of the frame in a manner similar to that as described in connection with FIG. 7. The respective ends of the belt are connected together by an arcuate length which in a manner similar to that of the elastic cables of each pair of elastic cables crosses a rectilinear or substantially rectilinear portion of the window on opposite sides of a corner. The particular arrangement of the elastic cables 64 and the belt 64' and the location on the rectilinear portions of the window over which the elastic elements pass may be seen in FIGS. 7 and 8.

The supporting table S comprises a structure which may be characterized as a carriage including a pair of superposed hollow platforms which in one dimension are substantially coextensive with the width of conveyor 1. Each platform may include a plurality of internal channels (not shown) and a horizontal portion of a plurality of arms 69 of L-shaped outline are received in the channels so that the arms are disposed in upstream and downstream pairs. By virtue of the several channels, the arms of each pair may be moved laterally to the direction of movement of the sheet and, also, may be adjusted to an upstream or downstream location relative to the sheet. Preferably, the arms, each of which supports an elastic block 70 will be positioned such that the elastic blocks are disposed within the confines of the contour of the window and preferably within the region of the individual corners. Each elastic block may be supported by its arm by means of an adjusting screw (not shown). The platforms are secured together by means of a carriage frame portion including a plurality of vertical and horizontal cross members as illustrated in FIG. 1. A pair of spaced apart plates extend outwardly from the frame member toward a pair of spaced rails 72 and a plurality of rollers 71, supported by the plates, cooperate with the rails in movement of the supporting table upwardly from the position in FIG. 1. Movement is imparted to the supporting table by means of a cylinder 73. The cylinder, likewise, preferably is a pneumatic cylinder. The cylinder is supported by the frame of the apparatus in a manner similar to the support of the cylinder 47. The rod of cylinder 73 is connected to the underside of the carriage frame portion so that the carriage frame portion moves vertically when the cylinder 73 is actuated.

In operation, sheets V which preferably are rectangular in outline including a score applied at an upstream work station comprising a closed contour corresponding to the shape of the window are conveyed seriatim by the conveyor 39 at a speed of approximately 30 meters per minute. Each sheet enters onto conveyor 1 at the same speed to commence the several steps, that is the movement of the subassemblies in the fabrication of a window of a particular contour. The movements are set off by a logical sequence system in response to a series of signals upon activation of one or more detectors. To this end, a pair of detectors 76, 76' which may be carried by one of the arms of the upstream conveyor 2 and the downstream conveyor 3, respectively, control the speed of movement of the sheet on the conveyor 1. The conveyor 1 is driven by gear reduction unit 23 through drive chains 19, 21, sprockets 17, 18, 20 and 22, and the pulley and belt arrangements. The speed of movement of the sheet V is approximately 30 meters per minute, thereafter it is reduced to about 5 meters per minute and then the sheet is arrested altogether. Thus, the upstream detector 76 is responsive to the leading edge of the sheet V thereby to command the gear unit to commence drive at the lower speed. The downstream detector 76', also responsive to the leading edge of sheet V, discontinues the drive to the several pulleys 14. The upstream and downstream detectors 76, 76' may be adjusted in position in accordance with the form and size of the sheets V which are then being conveyed. The conveyance of sheet V to the conveyor 1 cannot be effected unless there shall have been a signal from each of the detectors 77, 77' and 79. The former detectors may be supported by one of the plates 37, 37' of conveyor 2 and one of the plates 38, 38' of conveyor 3. These detectors provide a signal when the conveyors 2, 3 are in the horizontal position in readiness for receipt of sheets V. The latter detector is supported below the carriage frame member of supporting table S and provides a signal when the supporting table has descended completely.

After the sheet V is arrested on the conveyor 1, the arms 69 of the supporting table will previously have been adjusted so that the sheet is centered in relation to the blocks 70, the cylinders 46, 46' are activated to bring the cutting heads 42, 42' toward one another from their rest position to the position at which the cutting wheel 49 is adjacent to the score. During this operation, the arms 43, 43' are in a disposition such that the cutting heads 42, 42' are located above the plane of the sheet. Upon actuation of cylinders 46, 46', in movement of the arms 43, 43' simultaneously to the position of commencement of a score, the rods push on links 58 causing the shafts 44, 44' to slide in the channeled sleeves 45, 45'. The cylinder 47 is activated following location of the cutting heads 42, 42' to a position of commencement of the score. The cylinder is connected to the shafts 44, 44' by link 61 and when the shafts are drawn into rotation, the arms 43, 43' keyed on the shafts, lower so that cutting wheel 49 contacts the sheet V at about 5 mm from the score. The contact pressure previously will have been adjusted. Then the cylinder 46, 46' are activated, the rods pull on links 58 causing the incising of the break lines. During the incising of the break lines, the sheet V will rest upon the support rollers 26.

After the break lines have been incised, the cylinder 47 again is actuated to retract the arms 43, 43' and cutting heads 42, 42' to ultimately permit release of the window to the downstream work station and receive a further sheet V from an upstream work station.

Once the break lines are incised in the edges of sheet V, the supporting table is raised through action of cylinder 73. In movement, the carriage is guided by the rollers 71 and rails 72 to contact the sheet V. Actually, contact is made by the elastic blocks 70 which bear on the surface of the window within the score and preferably within the region of a corner at no more than a spacing of 5 cm. Once the sheet V is so supported, the conveyors 2, 3 are permitted to shift from the horizontal position (FIG. 1) to a retracted position at which they are substantially vertically aligned. Shifting movement is imparted by cylinders 27, 28. Detectors 78 are actuated by conveyors 2, 3 causing the supporting table S to continue its ascent toward the breaking chassis R. The sheet V, thus lifted in the direction of the breaking chassis, contacts the elastic elements, either in the form of elastic cables 64 or the elastic belt 64', and as the supporting table continues to ascend the elastic elements cause the edges of the sheet to flex about the score. The score opens up, and the edges of the sheet detach at the two break lines around the window. The bands of glass which are detached from the window fall and are collected by a hopper 74 for removal.

Thereafter, the conveyors 2, 3 return to the FIG. 1 position. The stringer 5 of each conveyor strikes a respective detector 77, 77' thereby actuating the cylinder 73 commanding descent of the supporting table S. The top plates 37, 37' and 38, 38' carrying the detectors ensure correct positioning of the conveyors 2, 3 in the horizontal position. As the supporting table descends, the window will be deposited on the belts 15 of conveyor 1. When the supporting table completes its descent, the lower portion of the carriage frame actuates a detector 79 which starts the conveyor 1 and both the intermediate conveyors 39 and 40 to move the next sheet downstream and convey the window to a downstream work station.

Each of the detectors may comprise a switch having a movable arm contacted, for example, by sheet V in movement, a photoelectric electric means or the equivalent as is well known.

The arrangement of the elastic elements is important to achieve good quality of detachment of the bands of the sheet from the window. Thus, if the elastic element comprises elastic cables, the elastic cables are arranged in pairs, providing one pair of cables for each corner of the window formed by the closed, contour score. Each elastic cable of each pair will traverse the score on opposite sides yet near the corner to bear on the rectilinear or substantially rectilinear portions (see FIG. 7). If the elastic element is a belt (see FIG. 8), the surfaces connecting the ends are arcuate and these surfaces, as the elastic cables of each pair, traverse the same portions of the score. The particular arrangement of the elastic cables or the particular shape of the belt assures that there is no sliding of the edges of the sheet on the window at the time of their detachment to obviate an action which may have the effect of generating chips or defects in the window.

As previously indicated, the clamp 48 comprising a portion of the cutting head 42, 42' and a support for the cutting wheel 49 is adjustable along the arms 43, 43' to position the cutting wheel relative to the position of the closed contour score on the sheet V to incise the break line as a prolongation of the longest rectilinear or substantially rectilinear score on the sheet. The operation in the detachment of the edges of sheet may be enhanced by arranging a further frame section 80 to the underside of frame 63. The frame section extends traverse to arrow F and one of the elastic cables 64, preferably, a cable adjacent to one of the two corners of the window from which the break line extends, is supported by the section 80. In this manner, the elastic cable will have the effect of acting on the edge of the sheet and the break line will begin to open along the edge to be detached. The break line will continue to open as the cable exerts greater flexing force and the entire edge of the sheet will detach as the other cables exert their action along the edges.

It has been found that good results are achieved in the detaching of the bands of the sheet V if the tension of each elastic cable is on the order of about 1.5 kg to about 3 kg. Generally, the tension may be about 2 kg. However, if the thickness of the sheet is increased beyond the thickness of a conventional window, then the tension may be increased toward the upper limit. The elastic belt preferably will be approximately 2 mm in thickness and formed of a material having good tearing strength and resistance to oils and petroleum derivatives which may be encountered during operation. The elastic elements may be formed of rubber or one of the rubber substitutes. In the alternative, the elastic belt may be formed of a non-elastic material and supported by the frame 63 by elastic cables such as the cables 64.

Additional arms 4 may be added to or removed from each of conveyors 2, 3, as necessary, to accommodate sheets V having varying shapes and size.

While the present invention relates to the detachment of edges of a sheet outside a closed contour score previously incised on the surface of the sheet, it is clear that the edges of a sheet along an approximately rectilinear cut-off line likewise may be detached by use of the apparatus. In this operation, it will not be necessary to incise break lines since the edges of the sheet may be detached through action of the elastic elements, alone. In this latter case, the plane of the elastic elements need not be parallel to the plane of the glass sheet, and the plane of the frame 63 on which the elastic elements are held may form an acute angle with the sheet. Thus, the frame 63 and the sheet will be arranged in such fashion that the elastic elements come into contact first with the edge of sheet to be detached or only with the edge.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

Having described the invention, what is claimed is:

1. Apparatus for detaching the edges of a glass sheet from a closed pattern having substantially rectilinear portions and a number of corners therebetween whose perimeter is defined by a cut-off line incised in the surface of the glass sheet comprising
    (a) a frame including a plurality of elements circumscribing an open area,
    (b) elastic means including a plurality of elastic straps joined together at one end and each strap supported at the other end by one of said frame elements to be disposed within said open area, said elastic straps arranged in pairs equal in number to the number of corners in said closed pattern, and said elastic straps of each pair extending across said cut-off line within a substantially rectilinear portion on opposite sides of and near each corner to bear on the edges of said glass sheet contiguous to said rectilinear portion,
    (c) means for supporting said glass sheet within the area of said closed pattern, and
    (d) means for moving at least one of said frame and supporting means toward the other whereby during movement said elastic means contacting the edges of said glass sheet exert a force to cause said edges to flex about and detach from said closed pattern at said cut-off line.

2. Apparatus for detaching the edges of a glass sheet from a closed pattern having substantially rectilinear portions and a number of corners therebetween whose perimeter is defined by a cut-off line incised in the surface of the glass sheet comprising
    (a) a frame including a plurality of elements circumscribing an open area,
    (b) elastic means including a belt formed by a body portion having a plurality of extensions equal in number to the number of corners of said closed pattern, and at least one elastic strap connecting each extension of said body portion to one of said elements thereby to dispose said elastic means within said open area, and wherein said elastic means is disposed such that only said extensions of said body portion cross said cut-off line within a substantially rectilinear portion to bear on the edges of said glass sheet contiguous to said rectilinear portion,
    (c) means for supporting said glass sheet within the area of said closed pattern, and
    (d) means for moving at least one of said frame and supporting means toward the other whereby during movement said elastic means contacting the edges of said glass sheet exert a force to cause them to flex about and detach from said closed pattern at said cut-off line.

3. Apparatus according to claim 1 or 2 wherein said elastic straps are in tension of between about 1.5 and 3.0 kg.

4. Apparatus according to claim 1 or 2 wherein at least one of said elements is movable thereby to enlarge or decrease the size of said open area to accommodate sheets of glass of varying size and to adjust the tension of said elastic means.

5. Apparatus according to claim 1 or 2 further including conveyor means for locating said glass sheet as it moves from an upstream to a downstream location relative to said frame and means for supporting said glass sheet.

6. Apparatus according to claim 5 wherein said conveyor means includes an upstream and a downstream conveyor, each said conveyor mounted for pivotal movement about a shaft arranged transverse to the direction of movement of said glass sheet and including a plurality of arms spaced apart and extending substantially parallel to said direction of movement, at least some of said arms of each conveyor interdigitated with the arms of the other conveyor, and further comprising means for retracting said conveyors in opposite rotational directions.

7. Apparatus according to claim 6 wherein said retracting means includes a first and second cylinder each having an actuating rod, means connecting each said rod to a respective conveyor whereby said cylinders control said conveyors for movement between a normal substantially horizontal position and a retracted position.

8. Apparatus according to claim 5 further comprising means for tracing break lines across edges of said glass sheet, each said break line commencing at a point within a respective edge adjacent said cut-off line and extending to the outer periphery of said glass sheet.

9. Apparatus according to claim 8 wherein said cut-off line defines a pattern including a plurality of corner portions and interconnecting substantially rectilinear portions, and wherein each said break line commences within the region of a corner and is substantially a prolongation of one substantially rectilinear portion.

10. Apparatus according to claim 8 wherein said means for tracing break lines includes a pair of cutting wheels, a pair of arms, means mounting each cutting wheel to a respective one of said arms, shaft means adapted both to translate along and rotate about its axis, each said arm supported by said shaft means for conjoint movement, and means for both translating and rotating said shaft means in operative sequence to locate, lower and then cause said cutting wheel to produce said break line.

11. Apparatus according to claim 8 wherein said frame includes a plurality of elements surrounding an open area, and said elastic means includes a plurality of elastic cables joined together at one end, and said apparatus further including a section arranged parallel to one of said elements on the underside of said frame, at least one of said elastic cables being supported by said section and the remainder supported by said frame whereby each cable of an arranged pair of cables traverses the cut-off line on opposite sides of and adjacent to a corner and each said section supported cable traversing said cut-off line near said break line.

12. Apparatus according to claim 11 wherein each said break line commences within the region of a corner and is substantially a prolongation of one substantially rectilinear portion.

13. Apparatus according to claim 1 or 2 including means for locating said frame stationarily in a plane substantially parallel to the plane of said glass sheet.

14. Apparatus according to claim 1 or 2 wherein said moving means includes a cylinder, a rod movable relative to said cylinder, and means for connecting said rod and said glass sheet supporting means whereby actuation of said cylinder results in movement of said glass sheet supporting means and said glass sheet which it supports toward said frame.

15. Apparatus according to claim 14 wherein said glass sheet supporting means includes a carriage, cushion means, means supporting said cushion means on said carriage in disposition to move into engagement with said glass sheet, and means for guiding movement of said carriage.

16. Apparatus according to claim 15 wherein said closed pattern includes substantially rectilinear portions and a number of corners therebetween, said cushion means including elastic blocks at least equal in number to the number of said corners, and said elastic block supporting means including an arm for each said elastic block and each said arm adjustable in position to dispose said elastic block which it carries within the closed pattern and adjacent a corner.

17. Apparatus according to claim 1 or 2 wherein said force exerted on the edges of said glass sheet is a progressively increasing force.

* * * * *